United States Patent [19]

Kaye et al.

[11] 4,352,554

[45] Oct. 5, 1982

[54] TITLE EDGE APPARATUS FOR SERIALLY PRODUCED COLLATED COPY

[75] Inventors: Stanton Kaye, 2216 Los Angeles St., Berkeley, Calif. 94707; Curtis Schreier, San Francisco, Calif.

[73] Assignee: Stanton Kaye, Calif.

[21] Appl. No.: 257,438

[22] Filed: Apr. 24, 1981

[51] Int. Cl.³ .............................. G03B 27/52

[52] U.S. Cl. .............................. 355/40; 355/39; 355/3 R

[58] Field of Search .............................. 355/39, 40, 43, 112, 355/3 R

[56] References Cited

U.S. PATENT DOCUMENTS

| | | | |
|---|---|---|---|
| 3,289,530 | 12/1966 | Samain | 355/43 |
| 3,620,622 | 11/1971 | Goodwin | 355/43 |
| 4,042,298 | 8/1977 | Herrmann | 355/40 |
| 4,322,157 | 3/1982 | Miura et al. | 355/40 |

*Primary Examiner*—Monroe H. Hayes

*Attorney, Agent, or Firm*—Townsend and Townsend

[57] ABSTRACT

Serially reproduced copies from a copy machine are edge printed with successive raster lines, preferably with alpha-numeric data to form a visible title. The title information is first loaded in a memory, preferably of the alpha-numeric digital variety. The title information is then sequentially scanned synchronously as each page of the collated copy is conventionally reproduced in a copier. As the copier reproduces copy, raster lines are serially imprinted at pixel locations on each edge of the pages being reproduced, each raster line being preferably and serially imprinted in groups of three pages. Serial scanning is preferably shown by a variable light source such as a liquid crystal or light emitting diode located at the page edge; alternately an optical scan for such serial scanning is shown. When sufficient copy has been run and collated, the collated paper when registered at the edges of each page displays printed information in the manner of title label found on the bindings of books.

15 Claims, 8 Drawing Figures

TITLE EDGE APPARATUS FOR SERIALLY PRODUCED COLLATED COPY

This invention relates to copiers and preferably to a copier in which imprinted page edges of collated documents display the document title.

STATEMENT OF THE KNOWN PRIOR ART

It is known to imprint pages in conventional printing processes on their edge to display markings. According to one prior art embodiment, such pages are stamped with rubber stamps on their edge to identify ownership. Other volumes have been indexed by printing at or near the page edges the sheets of the volume with a heavy pigment. When the discrete sheets are collated, the pigment appears through the edges of paper as a bar or the like.

SUMMARY OF THE INVENTION

Serially reproduced copies from a copy machine are edge printed with successive raster lines, preferably with alpha-numeric data to form a visible title. The title information is first loaded in a memory, preferably of the alpha-numeric digital variety. The title information is then sequentially scanned synchronously as each page of the collated copy is conventionally reproduced in a copier. As the copier reproduces copy, raster lines are serially imprinted at pixel locations on each edge of the pages being reproduced, each raster line being preferably and serially imprinted in groups of three pages. Serial scanning is preferably shown by a variable light source such as a liquid crystal or light emitting diode located at the page edge; alternately an optical scan for such serial scanning is shown. When sufficient copy has been run and collated, the collated paper when registered at the edges of each page displays printed information in the manner of title label found on the bindings of books.

OBJECTS AND ADVANTAGES

An object of this invention is to disclose a process of impregnating the edges of serially produced copy from a conventional copier with successive raster lines of title information. According to this aspect of the invention, the title information is loaded to the copier, typically in an electronic memory. When successive edges of a collated document are reproduced, successive raster lines of title information are scanned onto the edges of the produced copy, typically in groups of pages per raster lines. When the pages are collated, the side edges of the resultant registered paper stacks display title information.

An advantage of this invention is that it is not required to bind or stamp reproduced pages to display from their bound edges title information.

A further advantage of this invention is that title information can be displayed in virtually any format including alpha-numerics, graphics, symbols and other indicia, all dependent upon the resolution of the dot matrix utilized.

Yet another advantage of this invention is that the information can be displayed on the side edges, the leading edge or the trailing edge of reproduced copy.

A further object of this invention is to disclose an electronic alpha-numeric memory for use with title edging apparatus. According to this aspect of the invention, an electronic memory is loaded with title information. Thereafter, and dependent upon the total number of pages to be reproduced, the title information in the memory is successively scanned with successive raster lines for the desired alpha-numeric label. By sequentially scanning the memory from top to bottom, the image imprintation can be made from top to bottom on sequentially reproduced pages resulting in edge labeled pages.

An advantage of this aspect of the invention is that the alpha-numeric memory can be loaded in any number of conventional ways.

A further advantage of this aspect of the invention is depending upon the matrix resolution used in the successive raster lines and pixels for each raster lines, almost any image can be reproduced. For example, pictures themselves can be compiled on the sheet edges for the label of documents.

A further advantage of this invention is that existing copiers can be retrofitted with the disclosed invention.

Yet another object of this invention is to disclose an optical scan to produce the same edge labeling result. According to this aspect of the invention, a conventional mirror scan with a raster line displacement of the scan of a conventionally produced title image can occur.

An advantage of this aspect of the invention is that composite pictures can easily be reproduced.

Other objects, features and advantages of this invention will become more apparent after referring to the following specification and attached drawings in which.

Figure 1A:
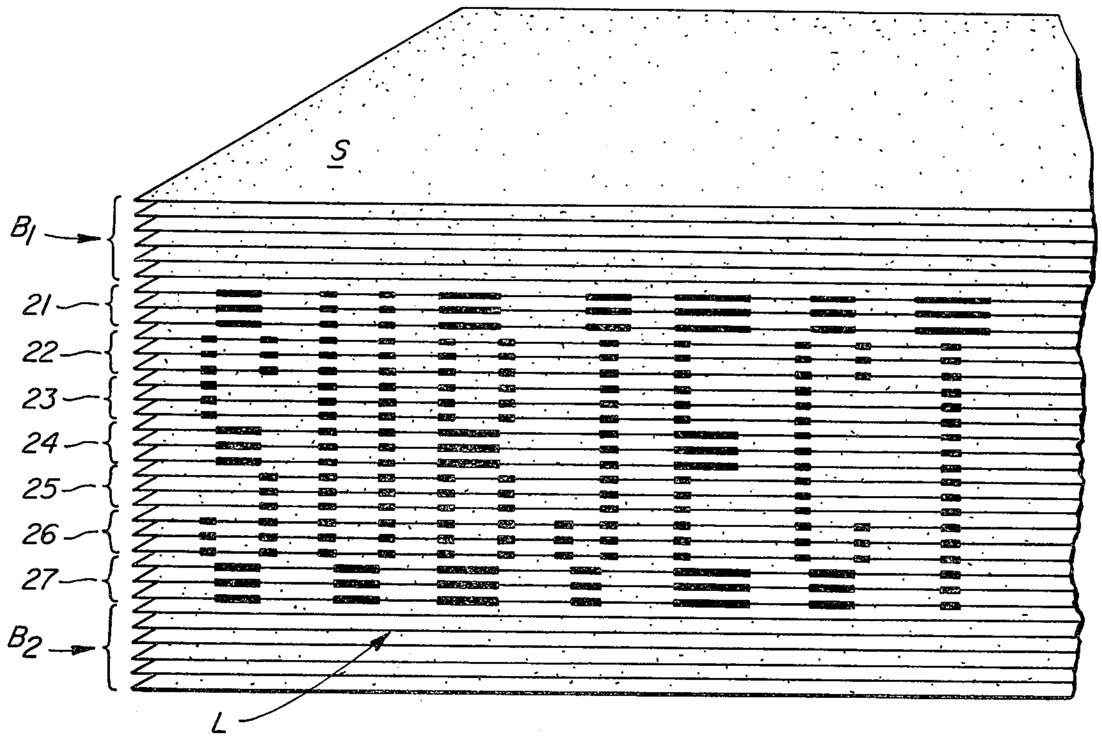
FIGS. 1A and 1B are respective exploded and assembled views of a matrix showing raster line and pixel location of the alpha-numeric word "SUBJECT" imprinted to the side edge of a collated and copier reproduced document.
Figure 1B:
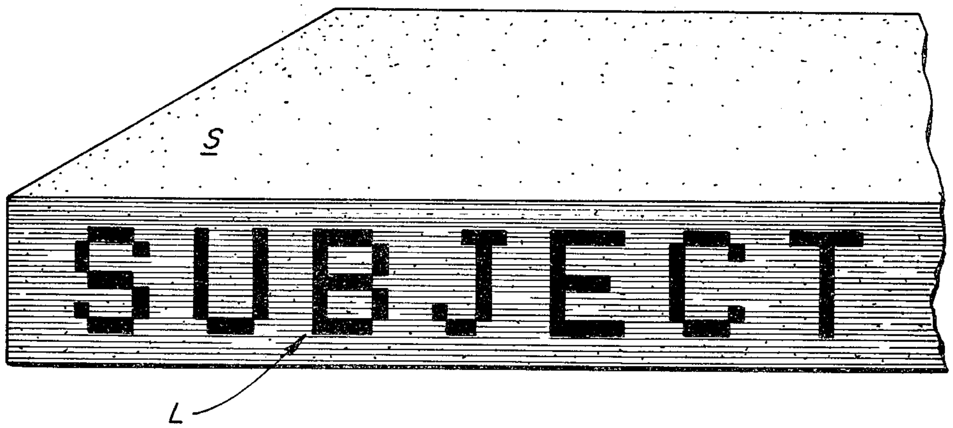

Referring to FIGS. 1A and 1B, a stack of sheets S is illustrated with a side imprinted label L thereon. In the exploded view of FIG. 1A, paired borders comprising the side edges of sheet groups $B_1$ and $B_2$ are shown. Between these respective borders, seven raster lines comprising groups of sheets 21–27 are shown. In the embodiment herein illustrated, each raster line consists of three successive sheets.

In the terminology that hereinafter follows, each raster of scan will be synonomous with a scanned line. The information on each line will be described as pixels. As here illustrated, it can be understood that each raster line is three pages of overall thickness. These three pages of overall thickness have identical information imprinted thereon.

Taking for example, line 21, it will be seen that top portion of the word "SUBJECT" is spelled as differing lines are imprinted, different and successive raster lines are imaged. It remains to be described how the papers are serially imprinted in accordance with this invention.

Figure 2:
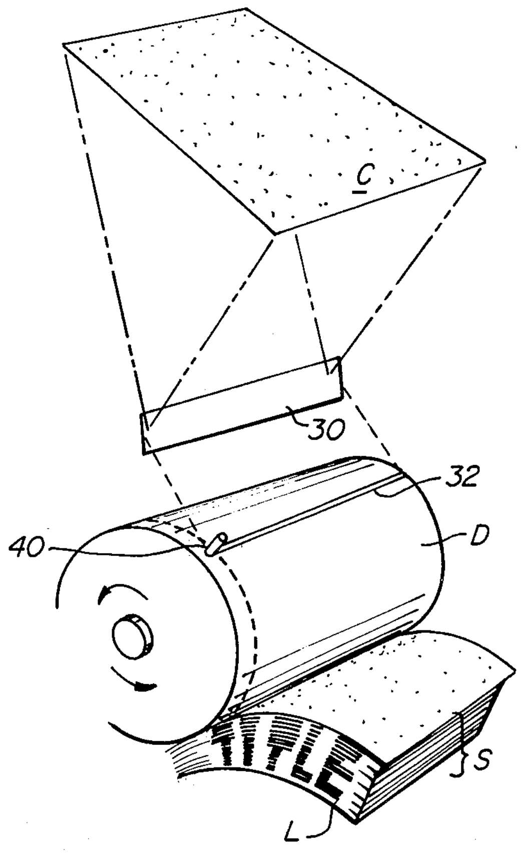
FIG. 2 is a schematic only of a copier illustrating the apparatus and process for imprinting serially on successive pages serial raster and pixel matrices of information by a light emitting diode, the imprinting occurring serially along a side edge of the sheet as the copy process occurs.

Referring to FIG. 2, an optically scanning copier relaying an image to a rotating drum is illustrated. Typically, a copy C is placed for imprintation to a glass plate (not shown). Scanning occurs typically by a high intensity light progressing from the top to the bottom of sheet C. Main relay optics 30 successively scan the sheet and relay an image to a copy scan portion 32 of a drum D having a sensitized surface. The drum rotates by any number of conventional impigmentation impregnating surfaces and reproduces copy. In the invention herein, the copy is made on a sequential basis and collated to the collated stack S schematically illustrated. It is appreciated by those skilled in the art that what is thus far described is completely conventional.

Illustrated in the embodiment of FIG. 2 is a light emitting diode 40. Light emitting diode is positioned to serially impregnate and label the side edge of the paper being copied. This edge impregnation imprints the title information L shown at the side edges of the collating copier S.

The question is how to generate the signal at the light emitting diode 40 as the successive sheets pass by.

Figure 3:
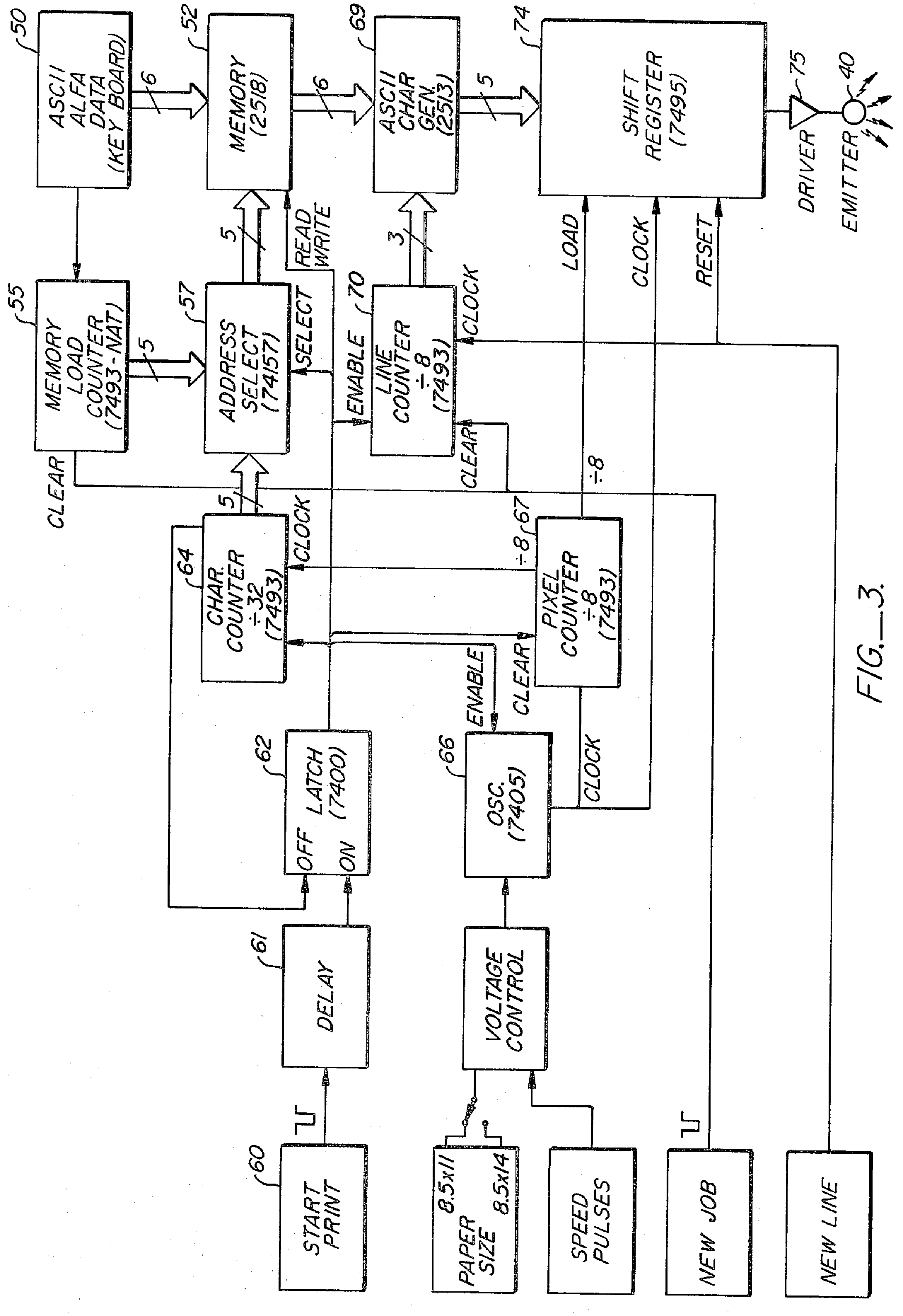
FIG. 3 is an electronic schematic illustrating a wholly electronic memory for imprinting the label information illustrated in FIGS. 1 and 2.

Referring to FIG. 3, a circuit is illustrated which can produce such a result. The circuit is schematically illustrated with various integrated circuits, which will be identified by manufacturer's numbers in parenthesis. All circuits referred to can be purchased from the Signetics Corporation of Sunnyvale, Calif., USA.

Referring to FIG. 3, a standard keyboard 50 is illustrated for the input to a memory 52 (2518) alphanumeric data. Each character input from the keyboard 50 is indexed by a memory load counter 55 (7493). Assuming that an address select 57 (74157) is in the proper mode, discrete letters in a 32 by 6 memory matrix can be sequentially loaded.

Assuming that the memory has been completely loaded, playing out of the characters to effect the imprintation shown in FIG. 2 can easily occur. Specifically, start button 60 is first depressed. After effecting an appropriate delay at 61 to effect synchronization of the message to the edge of the passing paper, a latch 62 (7400) initiates the 32 character counter 64 (7493) to start its character count. Character count is in turn activated by an oscillator 66 (7405) through a pixel counter 67 (7493) to the character counter 64. In the operation mode, character counter 64 will first register through the address select, the appropriate character in the memory 52. Memory 52 will pass the character to the character generator 69 (2513). The character generator will receive in sequence each character. As each character is generated, only a given line of the character will be scanned due to the indexing of line counter 70 (7493).

Thus, each character will be sequentially placed in the character generator 69 and will be sequentially scanned only at that line selected by line counter 70. This information will pass through shift register 74 (7495) through driver 75 to an emitter 40. Thus if the text matter "SUBJECT" is loaded into the memory 32, lines 21 will be scanned for the first three sheets, line 22 scanned for the next three sheets and so on. Naturally, the new line information can be coupled to a counter on the copier to effect the desired loading.

Figure 4A:
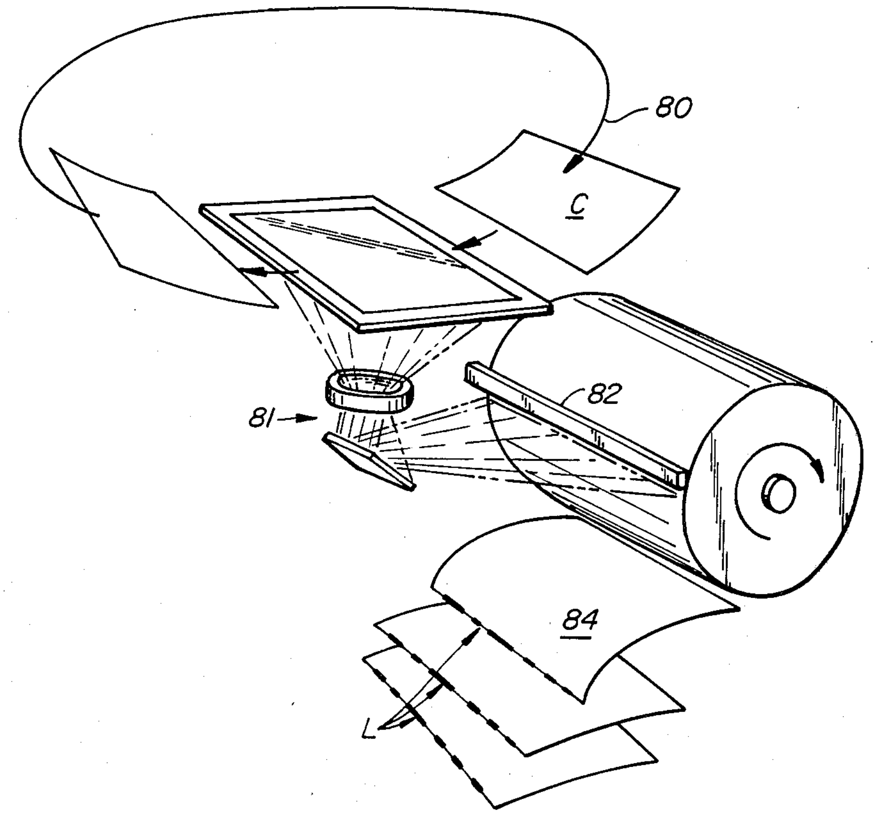
FIGS. 4A and 4B are an alternate embodiment for imprinting the leading or trailing edge of sequentially made copies, the imprinting here occurring simultaneously across the entire edge perpendicular to the direction of copy movement during copying.
Figure 4B:
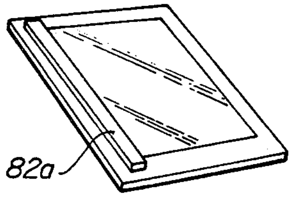

Referring to FIGS. 4A and 4B, a more usual type of copier is disclosed. In this type of copier, the pages are conveyed so that the bound edges constitute the leading and/or trailing edge of the copy being produced. It will be understood that the previous embodiment illustrated in FIGS. 2 and 3 relate to the impregnation of the side edges with the label information.

Referring to the schematic of FIG. 4A, apparatus known in the prior art 80 circulates copy C by and through a copy glass. The copy glass through a lens and mirror combination 81 reflects the signal to a rotating drum as is conventional in the art. The drum thereafter has registered to it a 160 LED array 82 for placing to the drum the edge data. Copy falls from the drum typically through a collator at copies 84 with the edge data L sequentially imprinted on each sheet.

It will be just as well understood that the LED array could just as well be placed at or near the plane of the copy glass. For example, referring to FIG. 4B, a 160 LED array 82A is shown registered at or near the vicinity of the copy glass. Other locations interior of the copy frame could be located, it being natural that having the arrays at the conjugate points of focus of the optical system herein disclosed is the preferred manner.

Figure 5:
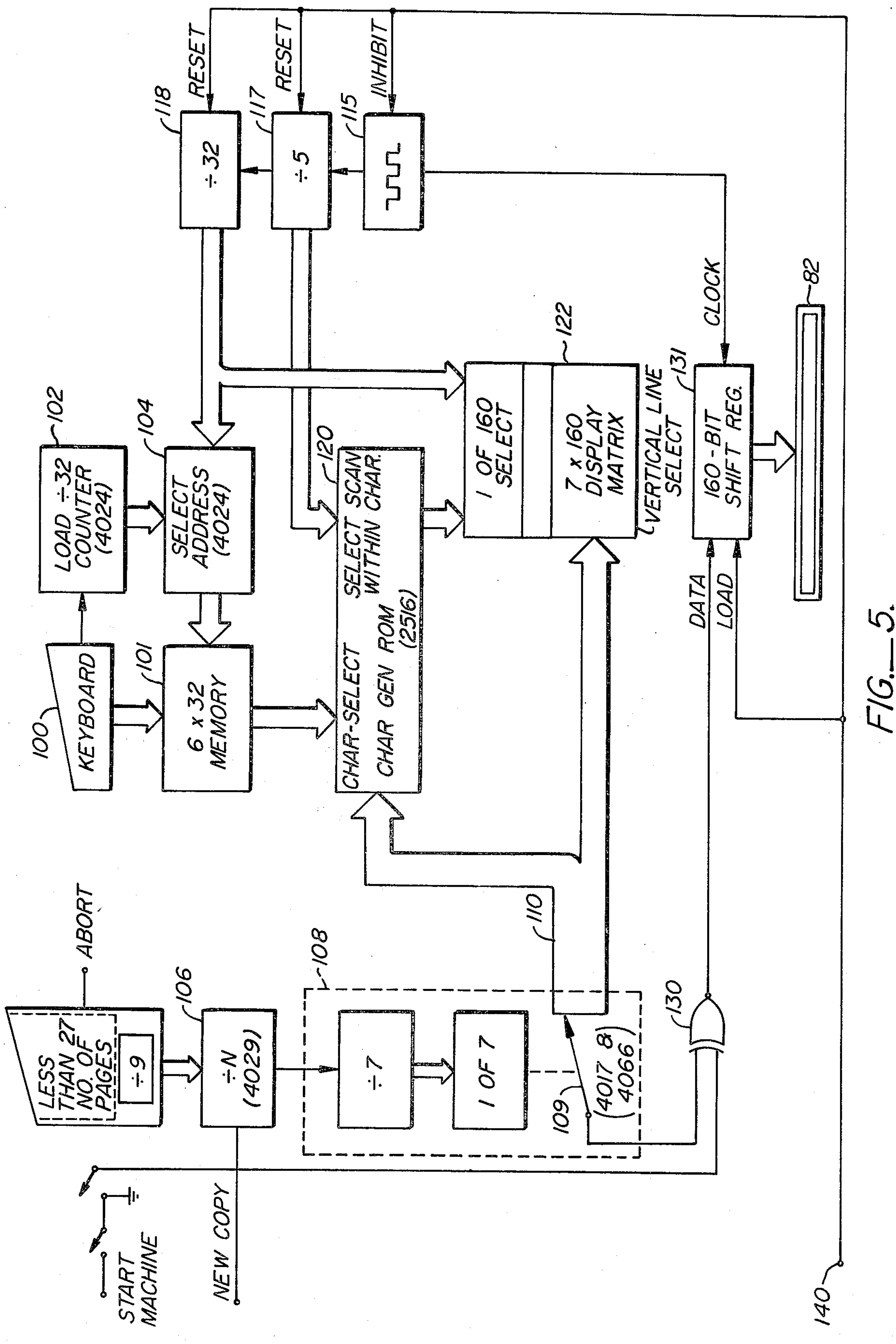
FIG. 5 is an electronic schematic of a memory for imprinting the leading or trailing edge; and, FIG. 6 is an optical embodiment illustrating the scan of a title physically inserted to a copier for imprintation on the copier edge.

Referring to FIG. 5, a circuitry for labeling either the leading or trailing edges of sequentially process copy is illustrated.

The memory is loaded in a conventional manner. Specifically, a keyboard 100 sequentially loads a 6 by 32 memory 101 selected as to memory address by a load counter 102 through a select address circuit 104. Assuming that the memory is fully loaded and conventionally connected, operation can be set forth. Assuming that the number of pages exceeds 27 and therefore that a minimum number of three pages per raster line is present, the copy machine is supplied through conventional counting mechanisms (not shown) with the total number of pages. Dividing these pages by nine, the copier determines through a conventional divider network (4029) the number of pages per line, which number is stored and output from register 106. At dividing network 108, the total number of pages is divided by 7 to determine the number of raster lines. Network 108 upon passing one-seventh of the total pages for copying, indexes to discrete lines. This is shown schematically at indexing pointer 109 to a bus 110.

Assuming that the leading or trailing edge of a copy is to be imprinted with the disclosed information, it is necessary to illuminate 160 LED strip 82 previously illustrated with respect to FIG. 4. This is done through a clock 115 to a respective character scan counter 117 and character select counter 118. In summary, counter 117 counts and thereafter scans each individual character and counter 118 indexes each character from the memory to the character generation ROM 120. Conventional display of the entire generated matrix can occur at a display matrix 122.

It is sometimes desired to have either white on black or black on white character lettering. At this point, an exclusive OR gate 130 effects alternate lighting of the shift register 131, causing in one state effective "on-off" and in the other state "off-on" illumination of alternating LEDs on the strip copier drum.

It should be apparent to the reader that the labeling of either the leading edge, the trailing edge, or both can be effected through a sync signal 140. Sync signal 140 can be generated in the manner previously illustrated at start 60 and delay 61 illustrated in FIG. 3. Alternately, labeling can occur by looking at and thereafter strobing strip 82 in registry to the sheets of copy passing through the machine. The important aspect of this invention is that such scanning occur on a line by line basis.

I have shown here in my preferred embodiment the electronic scanning common in the art today. It will be appreciated by the reader that electronic memories are not required for this invention. For example, it is possible to scan on a line by line basis a physically displayed message.

Figure 6:
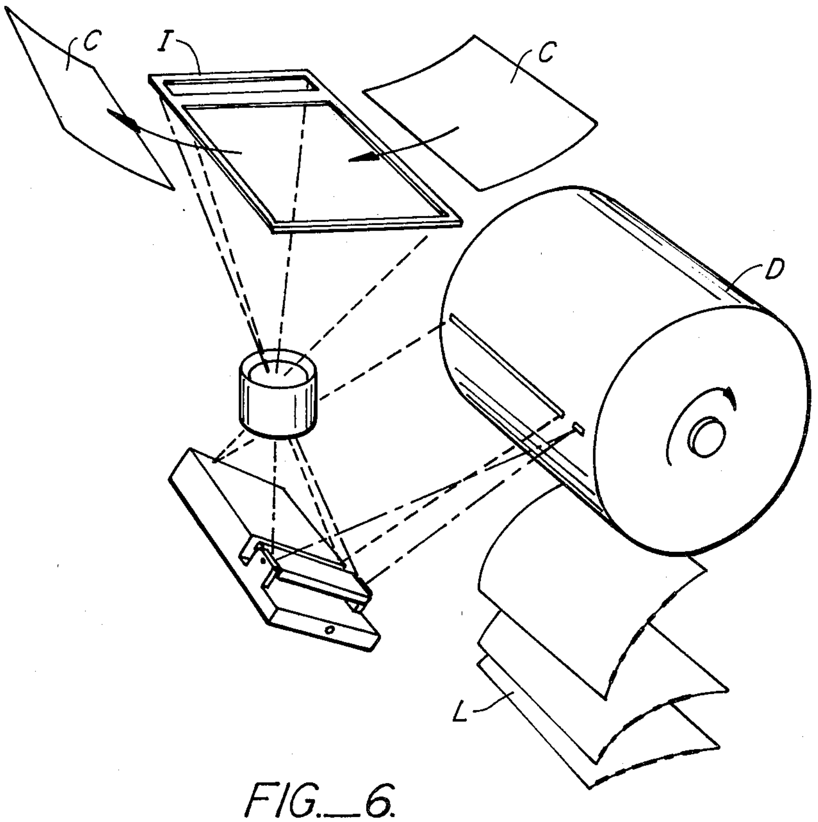

Referring to FIG. 6, an embodiment is illustrated in which an optical raster line scan is made. An electronic memory is not required.

According to this aspect of the invention, the raster mirror of the scanning optics is pivotally mounted. It addresses an image I of the title information and scans on a line by line basis. As is understood by those having skill in the optical art, the mirror may be shaped so that a raster line scan occurs. Thus the reader will understand that when we refer to the phenomenon of storing the image, we include as well optical storage as the now more traditional electronic storage.

Moreover, it is possible to have a scan mechanically moved to various portions of a message and have the scan be fully mechanical. The preferred electronic embodiment here illustrated is shown so that the reader can understand the full scope of my invention.

Likewise, it may be desired to play out onto a single copy in a special machine cycle the legend to be displayed on the sheet edges. According to this aspect of the invention, no copy is run through the machine. Instead, the machine is cycled and serially played at its 160 LED array 82 to imprint a single sheet of paper. The sheet of paper is examined for graphic spelling, spacing and the like before collation of an entire batch of copy occurs.

The term "pixel" has been utilized in this patent application. Although this word is of indefinite meaning as of this writing, we herein use the word "pixel" as any pictorial element on any form of display system dependent upon access to information stored in some computer memory or some computer storage medium. The term "pixel" now is commonly used in the computer graphics field and has rapidly gained acceptance for describing a memory-based pictorial element. It will be noted that the general embodiment of this invention, as distinguished from the preferred embodiment, includes means for reproducing the images which are not necessarily pixel related, as is specifically illustrated in FIG. 6.

Regarding the computer logic, we have illustrated TTL technology as the basis for our design. We make it clear that we wish to include any technical process, starting with application principles of logical, digital design to new or existing technologies defined in the semiconductor industries, such as DTL, TTL, CMOS, HMOS, NMOS and VLSI. Secondly, we wish to include any application and design methodologies, such as any electronic intelligence suitable for driving edge-circuitry, such as any computer, microcomputer and in any particular microcomputer technology which lends the appropriate generality. We intend to include any and all processes for the generation of title edge marking. Further, I intend to include graphics on computer printed paper, such as that paper which is collated in a zig-zag sequence—such as off a computer printer. Further, we have used the word "alphanumeric" as the basis for the data to be imprinted on the edge titling. We use this word in the broadest possible sense to include any method for generating symbols regardless of their style, character, form or content utilizing the process of generating pixels for the generation of digitized serial data for producing edge scans. Further, although we use three pages as a means of defining a group of digital elements or pixels for displays, this does not imply that three pages specify the process defining or limiting the embodiments herein. Moreover, we intend our use of the words "alphanumeric data" to include pictures and the like.

Other modifications of this invention can be appreciated by those having skill in the art.

What is claimed is:

1. The improvement in a machine to serially reproduce copy from original and place said copy in a collated array comprising in combination: means for retaining title information for imprintation to the edges of collated copy passing through said machine; means for serially scanning successive raster lines of said retained title information on a line raster basis synchronously onto edges of copy passing through said machine; means responsive to said scanning means for pigmenting the edge of said copy; means for indexing said scan to pigment successively said pages at the edge thereof, whereby when said pages are collated, the edges thereof display in location title information from the edges thereof.

2. The invention of claim 1 and including means registered to a side edge of the copier of said machine for serially pigmenting the side edge of passing copy, the legend.

3. The invention of claim 1 and including an array of light sources for imaging across a passing edge of copy, a raster line of information.

4. The invention of claim 3 and wherein said array of light sources images across said copy at either the leading or trailing edge thereof.

5. The invention of claim 1 and wherein said means responsive to said scanning means includes a light source adjacent said copy.

6. The invention of claim 1 and wherein said title information is retained in a memory having raster and pixel location therein.

7. The process of impregnating the edges of collated copy reproduced from serially imaged original with legend information comprising in combination: storing a legend to be serially reproduced on the side edges of collated copies; scanning a discrete raster line of the stored legend corresponding to discrete and serially copied groups of copies passing through said machine; imprinting the edges of passing copy with copy pigment to produce on the passing edges raster lines of title information; successively scanning said title information from the top raster line to the bottom raster line; collating discrete copies of said copy information whereby the side edges thereof display said stored title information.

8. The process of claim 7 and wherein said imprinting step includes the step of serially imprinting the side edge of copy.

9. The process of claim 7 and wherein said serial impregnation occurs along a side edge of said copier by serially turning on and off means for producing a side image as said copy passes through said machine.

10. The invention of claim 7 and wherein said process includes the step of imprinting substantially simultaneously a leading or trailing edge of said page simultaneously from a linear array to place said copy thereon.

11. The process of claim 7 and wherein said storing includes storing said legend in a memory in pixel form.

12. The process of claim 7 and wherein said imprinting step includes imprinting serially side edges in passing copy.

13. The invention of claim 7 and wherein said imprinting step includes imprinting the edges of passing copy simultaneously.

14. The process of claim 7 and wherein said imprinting occurs by forming an image adjacent the original being copied and conventionally copying said formed image to said copy at the edge thereof.

15. The combination of a copy machine for serially reproducing copy from original and placing said copy in a collated array; means for retaining title information in pixel format in an electronic memory for imprintation to the edges of collated copy passing through said machine; means for serially scanning successive raster lines of said retained title information on a line raster basis synchronously onto the edges of copy passing through said machine; means responsive to said scanning means for pigmenting the edge of said copy; means for indexing said scan to pigment successively said pages at the edges thereof responsive to the number of copies passing through said copier; means attached to said copier for collating said papers whereby the edges thereof in location display title information.

* * * * *